United States Patent [19]

Meijering

[11] Patent Number: 5,031,391
[45] Date of Patent: Jul. 16, 1991

[54] MOWING MACHINE

[75] Inventor: Henderikus Meijering, Ja Heeze, Netherlands

[73] Assignee: P. J. Zweegers en Zonen Landbouwmachinefabriek B.V., Geldrop, Netherlands

[21] Appl. No.: 525,027

[22] Filed: May 18, 1990

[30] Foreign Application Priority Data

May 30, 1989 [NL] Netherlands .......................... 8901359

[51] Int. Cl.$^5$ ............................................. A01D 34/23
[52] U.S. Cl. ........................................ 56/13.6; 56/255
[58] Field of Search .................. 56/6, 13.5, 13.6, 13.7, 56/13.8, 255, DIG. 17, DIG. 6; 74/665 F, 665 GB, 665 M, 625, 89.14

[56] References Cited

U.S. PATENT DOCUMENTS

| 2,645,074 | 7/1953 | Jones | 56/13.7 |
| 4,466,234 | 8/1984 | Sasaki | 56/6 X |
| 4,765,651 | 8/1988 | Unger | 74/89.14 X |
| 4,800,710 | 1/1989 | Von Allwoerden et al. | 56/13.6 X |
| 4,841,844 | 6/1989 | Tootle | 74/89.14 X |

FOREIGN PATENT DOCUMENTS

| 0272385 | 9/1987 | European Pat. Off. |  |
| 3622855 | 1/1988 | Fed. Rep. of Germany. |  |
| 6916183 | 5/1970 | Netherlands. |  |
| 7305170 | 10/1974 | Netherlands. |  |
| 7805129 | 11/1979 | Netherlands | 56/13.6 |
| 558384 | 2/1946 | United Kingdom. |  |
| 2081565 | 2/1982 | United Kingdom | 56/13.6 |

Primary Examiner—William P. Neuder
Attorney, Agent, or Firm—Oblon, Spivak, McClelland, Maier & Neustadt

[57] ABSTRACT

A mowing machine provided with a frame and a plurality of mowing members provided with mowing knives. The mowing members are supported by the frame and are rotatable about upwardly extending axes of rotation. Supporting members are arranged under the mowing members are vertically adjustable relative to said mowing members, and are secured to upwardly extending carrier shafts. Above the mowing members a substantially horizontally extending driving shaft is journalled in the frame and coupled to each of the carrier shafts by means of a transmission mechanism in such a manner that the transmission mechanism a rotating movement of the driving shaft is converted into a movement of the carrier shafts parallel to the axes of rotation of the mowing means.

7 Claims, 2 Drawing Sheets

MOWING MACHINE

BACKGROUND OF THE INVENTION

1. Field of the Invention

The invention relates to a mowing machine provided with a frame, with a plurality of mowing means provided with mowing knives, said mowing means being supported by the frame and being rotatable about upwardly extending axes of rotation, and with supporting means arranged under said mowing means and being vertically adjustable relative to said mowing means, said supporting means being secured to upwardly extending carriers.

2. Discussion of the Background

With the usual mowing machines of this kind the various carriers can be adjusted individually in order to be able to arrange the cutting knives of the mowing means at the desired distance from the ground surface. Not only is this a time-consuming activity, but there is also a risk that not all supporting means will rest on the ground, as a result of which only a few of said supporting means will carry the weight of the machine and be loaded heavily thereby, which may also lead to tracks being formed in the ground surface and to different cutting heights for each mowing means, resulting in an unacceptable mowing pattern.

SUMMARY OF THE INVENTION

The object of the invention is to obtain a mowing machine of the above kind, wherein the above disadvantage can be met.

According to the invention this can be accomplished in that above the mowing means a substantially horizontally extending driving shaft is journalled in the frame, said driving shaft being coupled to each of the carriers by means of a transmission mechanism, in such a manner that by means of said transmission mechanism a rotating movement of the driving shaft is converted into a movement of the carriers parallel to the axes of rotation of the mowing means.

When the construction according to the invention is used all supporting means can be vertically moved simultaneously and along the same distance as a result of the rotation of the driving shaft, so that fast and correct movement of the supporting means will be guaranteed.

A further aspect of the invention relates to a mowing machine provided with a tubular frame beam and with a plurality of mowing means provided with cutting knives and being rotatable about upwardly extending axes of rotation, said mowing means being supported by the frame, whereby each mowing means is coupled, via a transmission comprising a pair of conical gears, to a driving shaft journalled in the frame, one conical gear being connected with the mowing means and the other conical gear being connected with the driving shaft.

With the usual constructions of such a mowing device the conical gears are fixed to the driving shaft, and inserting the driving shaft into the frame and correctly bringing the conical gears of the various gear transmissions into engagement thereby requires a good deal of time.

According to the invention each mowing means is rotatably supported, by means of bearings, in a casing which is detachably secured to the frame beam, whilst the conical gear connected with the shaft is rotatably journalled in a part of the casing projecting into the frame beam and is provided with an nonrounded opening for longitudinally movably accommodating the driving shaft having a similar nonrounded section.

When the construction according to the invention is used the two conical gears of the gear transmission driving a mowing means can be mounted in the casing supporting the mowing means and can be correctly adjusted with respect to each other, after which the casing can be secured to the frame beam. Then the driving shaft can be passed through the nonrounded openings of the conical gears associated with the mowing means arranged in a row. In this manner fast and accurate mounting of the various parts can be achieved.

BRIEF DESCRIPTION OF THE DRAWINGS

The invention will be further explained hereinafter with reference to an embodiment of the construction according to the invention illustrated in the accompanying figures.

DESCRIPTION OF THE PREFERRED EMBODIMENT

Figure 1:
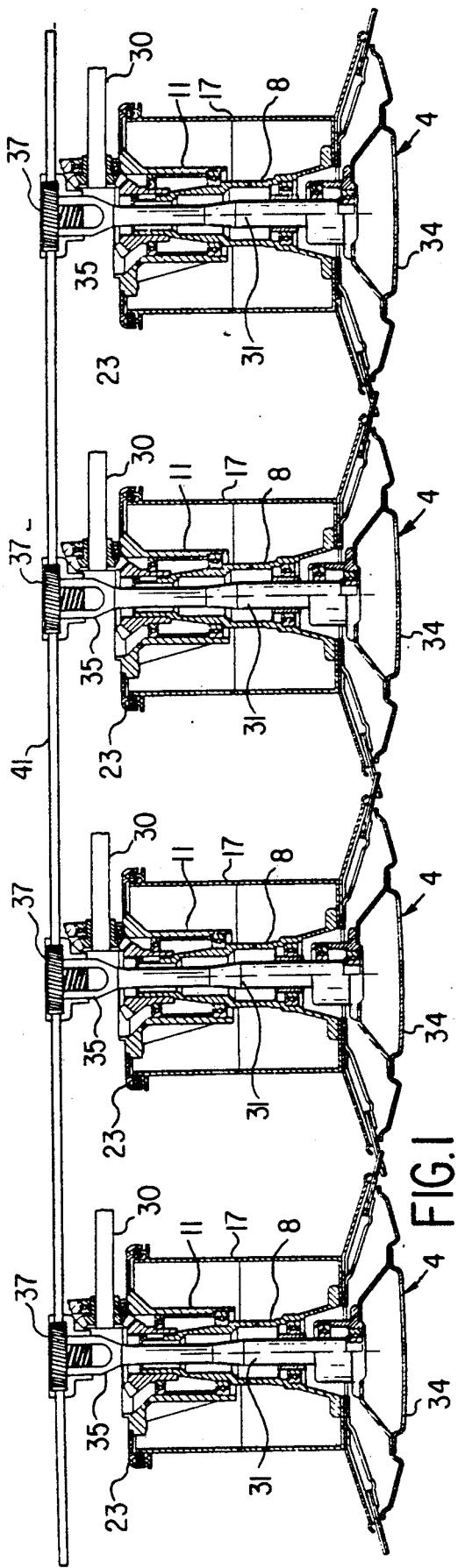
FIG. 1 shows the arrangement of a plurality of mowing means associated with a mowing machine, without the frame parts supporting said mowing means.
Figure 2:
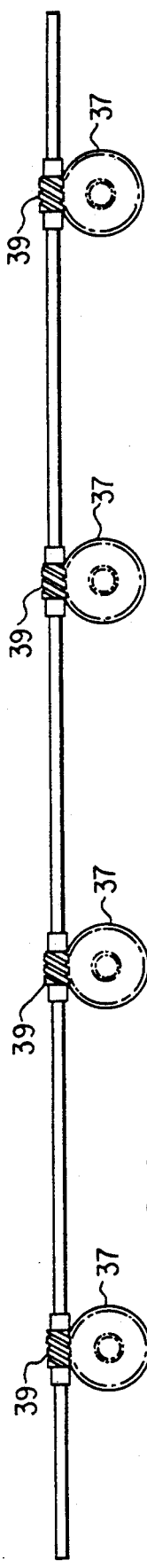
FIG. 2 is a plan view of a few of the parts illustrated in FIG. 1.
Figure 5:
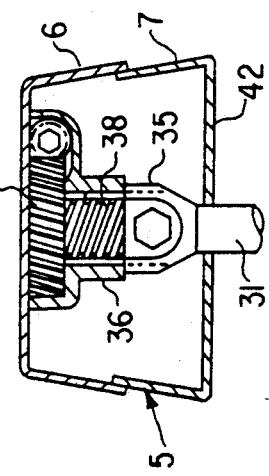
FIG. 5 is a cross-section of a part of FIG. 4.

FIG. 1 illustrates four mowing means 1-4, which form part of a mowing machine which may have an embodiment known per se, said mowing means 1-4 being arranged in a row extending transversely to the direction of movement during operation. As illustrated in greater detail in FIG. 3 the mowing means are thereby usually supported by a tubular frame beam 5 extending above the mowing means, said frame beam 5 being assembled, as appears in particular from FIG. 5, from a pair of at least substantially U-shaped beam parts 6 and 7 bent of sheet material.

Each mowing means comprises a hollow hub 8, which has a stepped configuration. The upper part of said hub 8 is supported in a casing 11 by means of bearings 9 and 10. Said casing 11 is at its upper side provided with a flange 12, which is fixed to the frame beam 5 by means of bolts 13. Said bolts 13 are passed through the frame beam 5 from above, more in particular through spacer sleeves 14 provided in the interior of the frame beam, and screwed with their threaded lower ends into threaded holes provided in the flange 12.

The lower end of the hub 8 is provided with a flange 15 integral with the hub. To said flange 15 there is secured a horizontally extending flange 16, which forms the lower end of a drum 17 surrounding the hub 8 and the casing 11. The lower end of a disc 18 partly projecting from the drum 17 rests against the flange 16. Under said disc 18 there are provided connecting means 19, by means of which cutting knives 20 are pivotably coupled to the other parts of the mowing means.

It will be apparent that the parts 16, 18 and 19 are clamped against the lower side of the flange 15 of the hub 8 with the same bolts.

At the upper side of the drum, at a short distance from its upper edge, there is formed a projecting flange 21 which supports an edge 22 concentrically surrounding the drum. An annular plate 23 is clamped against the lower side of the frame beam 5 with the flange 12. Near its circumference the plate 23 has two collars 24 and 25 extending downwards and surrounding each other concentrically, between which the collar 22 extends, as will be apparent in particular from FIG. 3. In this manner a sort of labyrinth gland is obtained, which prevents dirt from entering the interior of the drum 17.

Figure 3:
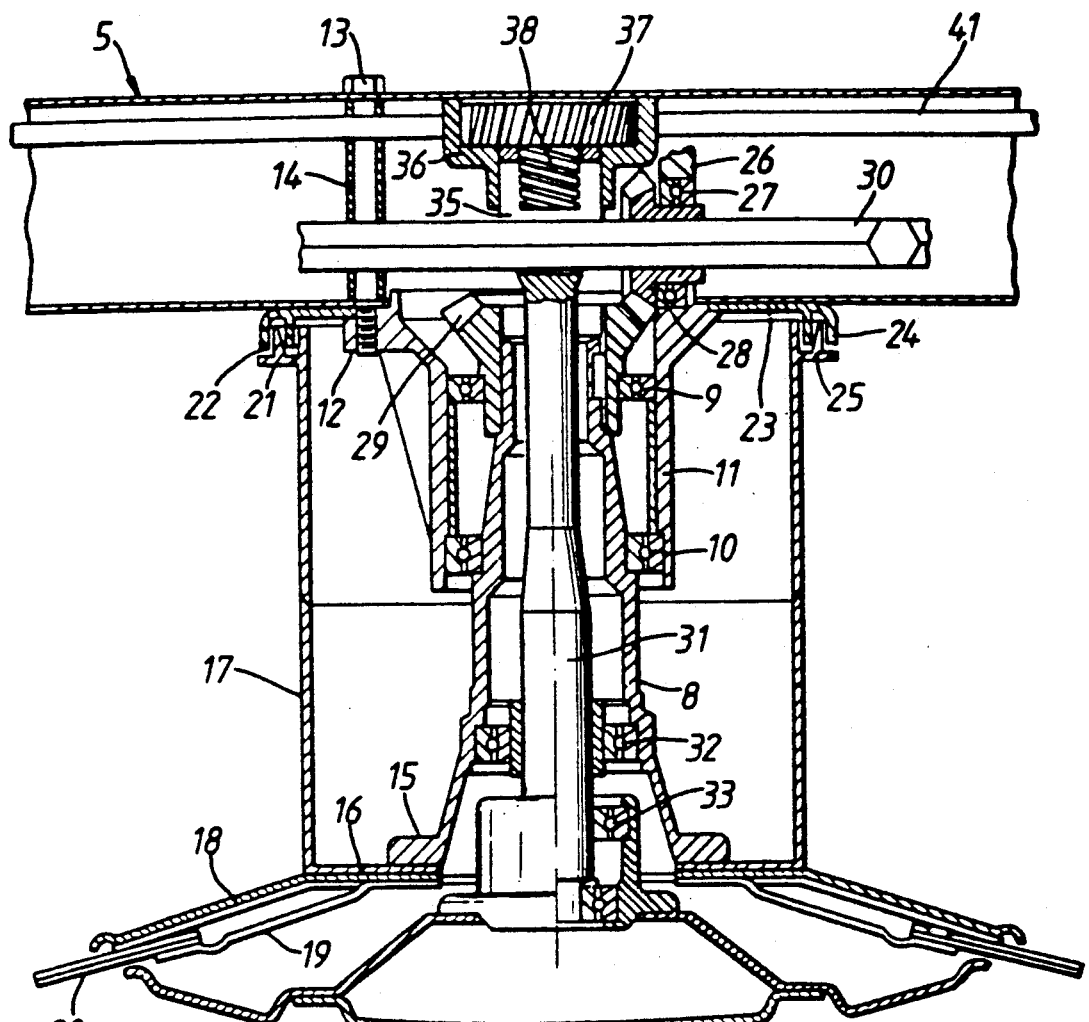
FIG. 3 is a larger-scale section of a mowing means and a frame beam supporting said mowing means.
Figure 4:
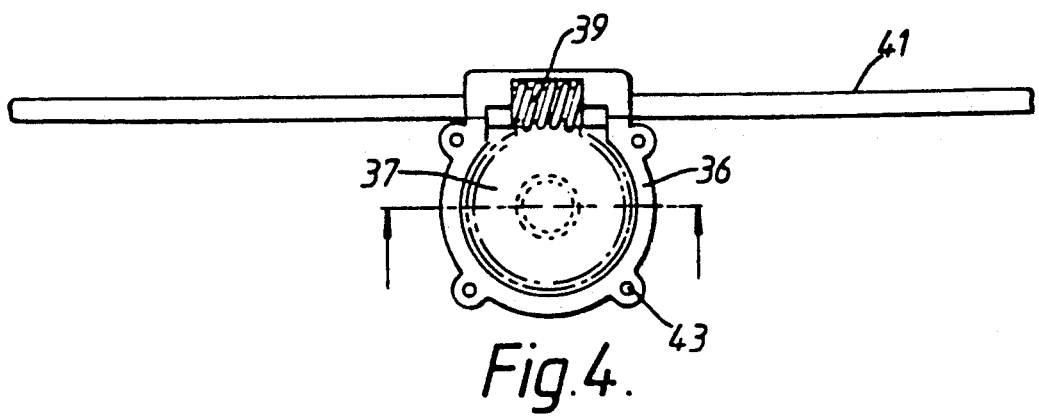
FIG. 4 is a plan view of a few parts illustrated in FIG. 3.

As furthermore appears in particular from FIG. 3 the casing 11 is provided with a part 26 projecting into the interior of the frame beam 5, in which a conical gear 28 is journalled by means of a ball bearing 27, in such a manner that said conical gear is freely rotatable about its central axis extending in the longitudinal direction of the frame beam 5, but that it is not axially movable. Said conical gear 28 is in engagement with a second conical gear 29, which is secured to the upper end of the hub 8.

The conical gear 28 is provided with an nonrounded, hexagonal in the illustrated embodiment, passage in which there is inserted a likewise hexagonal driving shaft 30.

In the interior of the hub 8 there is journalled a carrier or carrier shaft 31 by means of a bearing 32, in such a manner that the central axis of the shaft 31 coincides with the axis of rotation of the mowing means in question. To the lower end of the shaft 31 there is freely rotatably connected, by means of bearings 33, a supporting means in the shape of a supporting disc 34.

To the upper end of the shaft 31 there is secured a fork-shaped sliding piece 35. The upper end of the sliding piece 35 is accommodated, being movable in the longitudinal direction of the shaft 31, in a box or casing 36 which is fixed with bolts (not shown) to the inner wall of the upper part 6 of the frame beam 5. In the box 36 there is located a worm wheel 37, in such a manner that said worm wheel is rotatable about an axis of rotation which coincides with the central axis of the shaft 31. On the lower side of the worm wheel there is mounted an externally threaded stub 38 being integral with the worm wheel. The screw thread of said stub 38 is in engagement with corresponding screw thread formed on the facing ends of the two legs of the fork-shaped sliding piece 35.

In the box 36 there is furthermore journalled a worm 39, which is in engagement with the toothing of the worm wheel 37. The worm is thereby disposed such that its longitudinal axis or axis of rotation extends parallel to the longitudinal direction of the frame beam 5. The worm is provided with an nonrounded, hexagonal in the illustrated embodiment, passage 40. A driving shaft 41 is passed through the worms 39 associated with the various mowing means, said driving shaft having a section corresponding with the section of the passage 40.

It is noted that in FIG. 1 only parts of the driving shaft 30 which pass through the conical gears 28 associated with the various mowing means are illustrated, while in said FIG. 1 also the shafts 31, in particular the fork-shaped sliding pieces mounted on the upper ends of said shafts are illustrated in a position turned 90° with respect to the actual position.

For mounting the mowing device the mowing means 1 can be assembled into a unit with the casing 11, the shaft 31 and the box 36, after which the units thus formed are connected to the frame beam 5, by inserting the upper end of the shaft 31 supporting the box 36 and the projection 26 of the casing 11 carrying the conical gear 28 into the interior of the frame beam 1 through an opening 42 provided in the lower box part 7 for that purpose, after which the flange 12 can be secured, by means of the bolts 13, against the lower wall of the frame beam 5, while the box 36 is clamped against the inner side of the upper part 6 of the frame beam 5 by means of bolts (not shown), which are screwed into threaded holes 43 provided in the box 36 for this purpose.

After the various mowing means have thus been connected to the frame beam 5 the driving shaft 30 may be passed from one end of the frame beam through the passages of the conical gears 28 disposed in a row, and then be secured against displacement in an appropriate manner. Furthermore there will be provided suitable means for rotating the shaft 30, e.g. from the power take-off shaft of a tractor moving the mowing device during operation, in order to be able to rotate the mowing means in a manner usual for mowing machines of this kind.

It is also possible for the shaft 41 to be passed through the aligned openings 40 of the various worms 39, and then be secured against longitudinal displacement. Suitable means will furthermore be connected with at least one end of the shaft 41 in order to be able to rotate the shaft 41, either by hand or by means of a driving mechanism.

It will be apparent that because of the rotation of the shaft 41 in the one or the other direction all worm wheels 37 associated with the various mowing means 1–4, with threaded stubs 38 mounted thereon, will be rotated and that said rotation will result in a simultaneous upward or downward movement of all shafts 31 with all discs 34 supporting the device.

Obviously, numerous modifications and variations of the present invention are possible in light of the above teachings. It is therefore to be understood that within the scope of the appended claims, the invention may be practiced otherwise than as specifically described herein.

What is claim is:

1. A mowing machine which comprises:
   a frame;
   a plurality of mowing means mounted on said frame and being provided with mowing knives, said mowing means being rotatable about upwardly extending axes of rotation, each of said mowing means including:
   a mowing member;
   a plurality of supporting means respectively arranged under said mowing member;
   a substantially horizontally extending first driving shaft journalled in said frame above the mowing member;
   a transmission mechanism for coupling said first driving shaft to said mowing member for converting rotation of the first driving shaft into rotation of said mowing member;
   a second driving shaft mounted to said frame; and
   means for connecting said second driving shaft to each of said supporting means and for simultaneously vertically adjusting each of said mowing members.

2. A mowing machine according to claim 1, wherein said first driving shaft comprises a nonrounded driving shaft;
   said transmission comprises a first and second conical gear, said first conical gears being connected with said mowing means and said second conical gear being connected with said first driving shaft; and each of said mowing means includes a casing which is detachably secured to said frame wherein said second conical gear connected with said first driving shaft is rotatably journalled in a part of said casing which projects into said frame beam and includes a nonrounded opening for longitudinally movably accommodating said nonrounded driving shaft.

3. A mowing machine according to claim 1, wherein each of said mowing means includes:
a casing fixed to said frame;
a hub which is supported at an upper end of said casing; and
a carrier shaft movably mounted in said hub wherein said supporting means is secured at a lower end of said carrier shaft.

4. A mowing machine according to claim 3, wherein each of said mowing means includes:
a worm wheel;
a stub mounted on said worm wheel;
threaded means for coupling an upper end of said carrier shaft to a said stub; and
a worm mounted on a said second driving shaft for engaging said worm wheel.

5. A mowing machine according to claim 3, wherein an upper end of the carrier shaft has fork-shaped ends and wherein the first driving shaft passes between legs of the fork-shaped ends of the carrier shaft.

6. A mowing machine according to claim 2, wherein the casing includes a flange at an upper end thereof which is clamped against a lower side of the frame.

7. A mowing machine according to claim 4, which comprises a worm casing wherein the worms and worm wheel are respectively journalled in said worm casing and wherein said worm casing is detachably clamped to the frame against an upper wall of the frame.

* * * * *